United States Patent [19]

Urquhart

[11] 4,343,546

[45] Aug. 10, 1982

[54] LATCH MECHANISM FOR USE WITH REMOVABLE MEDIA

[75] Inventor: Roderick M. Urquhart, Fife, Scotland

[73] Assignee: Burroughs Corporation, Detroit, Mich.

[21] Appl. No.: 120,818

[22] Filed: Feb. 12, 1980

[30] Foreign Application Priority Data

Feb. 15, 1979 [GB] United Kingdom ............... 7905387

[51] Int. Cl.³ ..................... G03B 17/26; G11B 17/04; G11B 23/02
[52] U.S. Cl. .................................... 354/281; 360/99; 360/133
[58] Field of Search ............... 354/275, 276, 278, 281, 354/282; 360/133, 99; 353/25

[56] References Cited

U.S. PATENT DOCUMENTS

| 1,505,000 | 8/1924 | Whiting | 354/282 |
|---|---|---|---|
| 2,462,683 | 2/1949 | Schwartz et al. | 354/281 |
| 3,662,360 | 5/1972 | Lambert | 360/133 X |
| 3,690,753 | 9/1972 | Dahl | 353/25 X |
| 3,854,784 | 12/1974 | Hunt et al. | 360/133 X |
| 3,931,644 | 1/1976 | Ward | 360/99 X |
| 3,951,264 | 4/1976 | Heidecker et al. | 360/99 X |
| 4,006,980 | 2/1977 | Wells | 353/25 X |
| 4,188,650 | 2/1980 | Rein | 360/133 |

FOREIGN PATENT DOCUMENTS

| 1000778 | 8/1965 | United Kingdom . |
|---|---|---|
| 1414801 | 11/1975 | United Kingdom . |
| 1446654 | 8/1976 | United Kingdom . |
| 1460331 | 1/1977 | United Kingdom . |
| 1488942 | 10/1977 | United Kingdom . |
| 1492796 | 11/1977 | United Kingdom . |
| 1522528 | 8/1978 | United Kingdom . |

*Primary Examiner*—Donald A. Griffin
*Attorney, Agent, or Firm*—David G. Rasmussen; Kevin R. Peterson

[57] ABSTRACT

A data storage file, for use with removable data storage media, is provided with a latch mechanism. The removable, data storage media, is provided with a containing protective sleeve.

When the removable media, contained within the protective sleeve, is inserted into the data storage file, the latch mechanism actively retains the removable media, allowing the independent withdrawal, from the data storage file, of the protective sleeve, leaving the removable media loaded in the data storage file.

When the protective sleeve is re-inserted into the data storage file, so as to contain the removable media, already loaded in the data storage file, the latch mechanism lets go of the removable media, allowing the withdrawal, from the data storage file, of the removable media, contained in and together with the protective sleeve.

The protective sleeve actively retaining the removable media, the removable media is within the protective sleeve at all times if it is not loaded in the data storage file.

16 Claims, 22 Drawing Figures

LATCH MECHANISM FOR USE WITH REMOVABLE MEDIA

BACKGROUND TO THE INVENTION

1. Field of the Invention

The present invention relates to an apparatus for the storage of retrievable informational data, which employs removable, data storage media.

In particular, the present invention relates to apparatus whereby the removable, data storage media is automatically protected from environmental damage at all times it is external to the data storage apparatus.

2. The Prior Art

The removable media, employed in data storage files, is well known to suffer from environmental contamination problems. Debris and fingerprints, on the surface of magnetic discs, causes degradation and ultimate destruction of the data storage properties of the discs.

In the case of rigid discs, this problem has been overcome by surrounding the disc with a sealed cartridge, which is opened only when the disc is within the storage file.

In the case of flexible magnetic discs, however, no such solution has appeared. An attempt has been made to protect flexible discs by means of a surrounding jacket, which posesses, of necessity, apertures which allow operational access, to the disc, of magnetic recording heads and disc rotating apparatus. The jacket itself has been lined with cleaning material so that debris and other foreign matter are, to a large extent, cleaned from the surface of the disc as it rotates within its jacket.

The operational access apertures in the flexible disc jacket pose a problem when the disc is external to the data storage file, since foreign matter is free to contaminate the surface of the disc through these openings.

In the past, a storage envelope has been provided so that, when not in use, the flexible disc, in its jacket, may be kept within the storage envelope, which covers the operational access apertures on the jacket, thus providing a degree of environmental protection.

The storage envelope approach is not without disadvantages. It requires that the operator, by hand, inserts the disc into the envelope when it is not required for use. The use of the hand, for insertion or removal of the disc, risks fingerprint contamination. Failure to insert the disc into the envelope risks debris contamination. Further, the operational apertures of the disc jacket are covered only if the disc is inserted into the envelope in the correct attitude.

It is therefore advantageous that the protection of the disc, when it is external to the data storage file, be complete and automatic, so that it is possible neither to touch the disc with the hand nor to omit its proper inclusion in a protective device.

3. Object of the Invention

Accordingly, it is a prime objective of the present invention to provide means whereby the above objectives are achieved.

A more specific object of the present invention is to provide a protective sleeve and latch mechanism, for use in a data storage file, employing removable media, whereby the operator has neither physical contact with the disc nor control over its insertion or non-insertion into protective covering.

BRIEF DESCRIPTION OF THE INVENTION

In accordance with the present invention, a disc protective sleeve is provided together with a latch, which is located inside a data storage file, such that, on insertion of the disc, in a modified jacket, and contained within its protective sleeve, into the data storage file, the latch actively retains the disc, allowing the independent withdrawal of the protective sleeve from the data storage file, and leaving the disc loaded in the data storage file. On subsequent insertion of the now empty disc protective sleeve, into the data storage file, so as to contain the disc, the latch lets go of the disc, which is actively retained within the protective sleeve, and may be withdrawn, together with the protective sleeve, from the data storage file.

In a first preferred embodiment of the invention, a disc protective sleeve is provided which interacts with a latch, so that the latch engages or disengages a slot, cut into the disc jacket, dependent on the presence, on insertion, of the disc in the protective sleeve.

In a second embodiment of the invention, a disc protective sleeve is provided which interacts with a latch, so that the latch engages or disengages a slot pattern, cut into the side of the disc jacket, dependent on the presence, on insertion, of the disc in the protective sleeve, and also dependent on the correct attitude of insertion of both the disc and protective sleeve.

The novel features that are considered characteristic of this invention are set forth with particularity in the appended claims.

The invention itself, both as to its organisation and method of operation, as well as additional objects and advantages thereof, will best be understood from the following description when read in connection with the accompanying drawings.

DESCRIPTION OF THE FIRST PREFERRED EMBODIMENT

Figure 1:
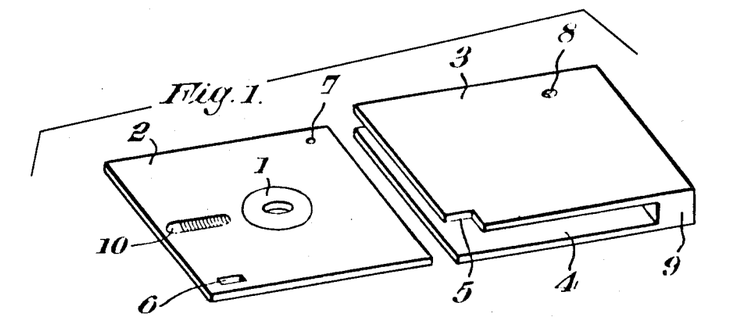
FIG. 1 shows, in exploded view, the disc in its modified jacket, and the disc protective sleeve of the first preferred embodiment.

Attention is first drawn to FIG. 1, showing the disc (1) in its jacket (2), having an aperture for head access (10) and modifications comprising a latch engaging slot (6) and a depression or hole (7), and also showing the protective sleeve (3) having a void (4) between its two surfaces, a latch engaging recess (5), a dimple (8) projecting into the inter-surface void (4), and a handle (9) for grasping the protective sleeve (3) during disc loading or disc inserting operations.

Figures 2, 3:
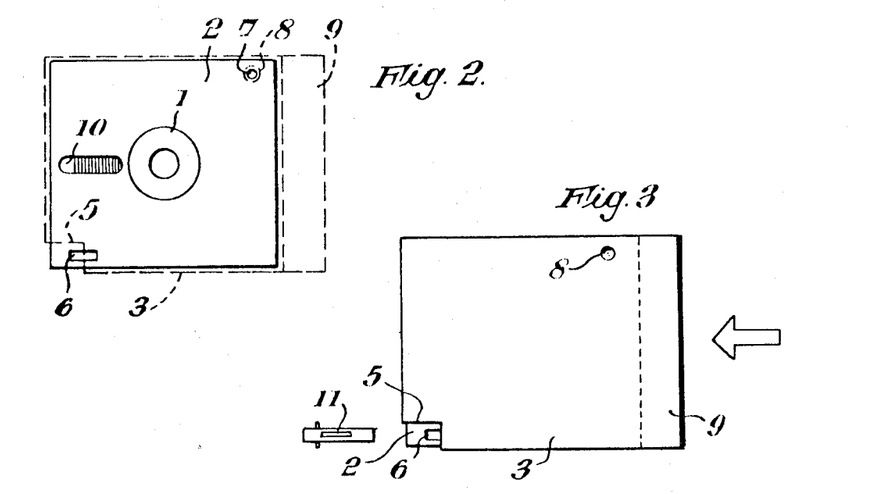
FIG. 2 shows how the various parts of the disc and protective sleeve of the first preferred embodiment come together, the disc in its jacket being shown in solid line and the protective sleeve in broken line.
FIG. 3 shows how the disc in its modified jacket, disc protective sleeve, and latch mechanism, of the first preferred embodiment, are spacially interrelated when the disc is inserted into a data storage file.

Attention is next drawn to FIG. 2, showing how the disc (1) in its jacket (2), depicted in solid line, is contained within the protective sleeve (3), depicted in broken line, so that the head access aperture (10) is totally covered, the dimple (8) in the protective sleeve surface mates with the hole or depression (7) in the disc jacket (2), so providing a retaining force on the disc (1) in the protective sleeve (3), and the latch engaging recess (5) in the protective sleeve (3), partially covers the latch engaging slot (6) in the manner shown.

Attention is next drawn to FIG. 3, showing how the disc, in its jacket (2), the protective sleeve (3), and the latch mechanism (11) are spatially related. As the disc and protective sleeve (3) are inserted into a data storage file by means of the handle (9), the latch mechanism (11) engages the latch engaging slot (6) cut into the disc jacket (2).

Figure 4:
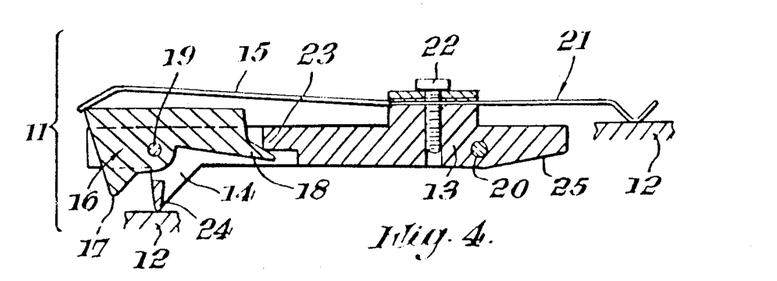
FIG. 4 shows the various parts of the latch mechanism of the first preferred embodiment.

Attention is next drawn to FIG. 4, which shows the various parts of the latch mechanism (11).

A main lever arm (13) is attached to the body of the data storage file by the main lever arm pivot (20). A secondary lever arm (16) is attached to the main lever arm (13) by the secondary lever arm pivot (19). A disc retaining tooth (14) is integral with the main lever arm (13). The secondary lever arm (16) is provided with a disc sensing lug (17) and a protective sleeve interacting spur (18) as shown. Clockwise rotation of the secondary lever arm (16) about the secondary lever arm pivot (19) is restrained by the first secondary lever arm stop (24), located on the disc retaining tooth (14). Counterclockwise rotation of the secondary lever arm is restrained by the second secondary lever arm stop (23) located on the main lever arm. Clockwise rotation of the main lever arm (13) is restrained by the main lever arm stopping surface (25) which, bears on the surface of the protective sleeve (3). (FIG. 3)

The entire latch assembly (11) is forced downwards by two leaf springs, (15 & 21) which are separate lengths of a single spring, affixed to the main lever arm (13) by the spring attaching assembly (22), bearing at one end against the body of the data storage file (12) and at the other against the secondary lever arm, the first spring (21) causing the main lever arm to want to rotate counterclockwise and the second spring (15) causing the secondary lever arm to want to rotate counterclockwise relative to the main lever arm. Counter clockwise rotation of the main lever arm (13) is retained by the impingement of the disc retaining tooth (14) on the body of the disc file (12).

Figure 5A:
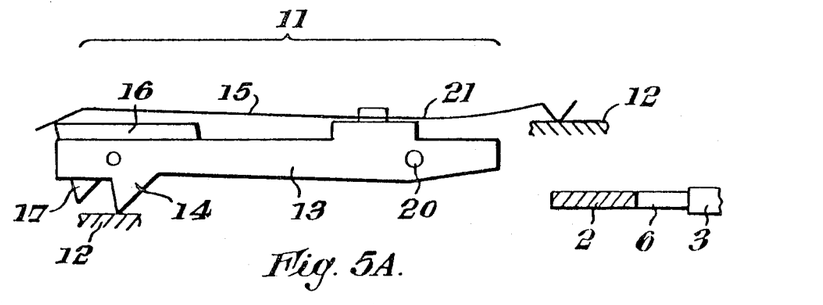
FIG. 5A thru FIG. 5D show the sequence of events when the disc is loaded into and unloaded from a data storage file using the first preferred embodiment.

Attention is next drawn to FIG. 5A, showing how the disc, in its jacket (2), and protective sleeve (3), approaches the latch assembly (11) during a disc loading operation. The disc jacket (2) is shown in a cutaway section to expose the latch interacting slot (6) for purposes of easier visualisation.

The disc jacket (2) and protective sleeve (3) slide below the main lever arm (13) so that the leading edge of the disc jacket (2) strikes the sloping edge of the disc retaining tooth (14), causing the main lever arm (13) to rotate clockwise on the main lever arm pivot (20) by forcing the disc retaining tooth (14) upwards, until it rests on the upper surface of the disc jacket (2). The disc retaining tooth (14) then slides along the upper surface of the disc jacket (2), being held onto it by the first spring section (21).

Figure 5B:
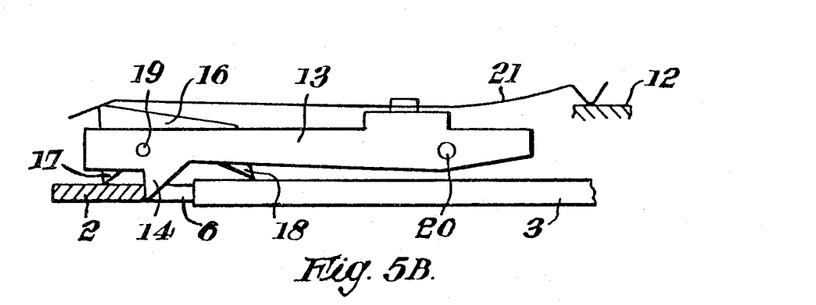

Attention is next drawn to FIG. 5B, showing the situation of the disc jacket (2) and latch, (11) with the protective sleeve (3) still present, at the point of loading. The disc retaining tooth (14) has, after sliding over the upper surface of the disc jacket (2), fallen, under the pressure of the first spring (21), into the latch engaging slot (6), the disc jacket (2), being held against withdrawal by the sheer edge of the disc retaining tooth (14). The secondary lever arm (16) has rotated on its secondary lever arm pivot (19) so that the disc sensing lug (17) rests on the disc jacket (2) and the protective sleeve interfacing spur (18) lies on the upper surface of the protective sleeve (3). The retaining force provided on the disc jacket (2) by the disc retaining tooth (14) is greater than the force provided by the dimple (8) and hole or depression (7) on the protective sleeve (3) (See FIG. 2) and disc jacket (2) respectively, thus ensuring that tugging on the protective sleeve (3) by means of the handle (9) will remove the protective sleeve (3) from the data storage file, leaving behind the disc (1) in its jacket (2).

Figure 5C:
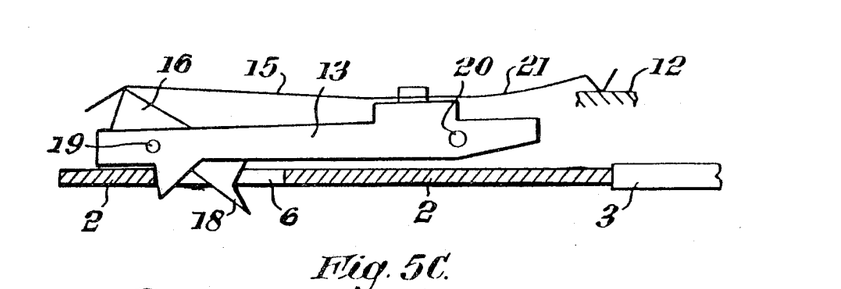
Figure 5D:
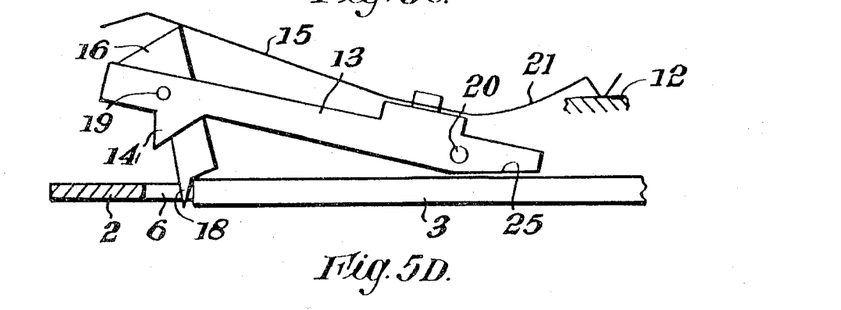

Attention is now drawn to FIG. 5C, showing the conditions which prevail as the protective sleeve (3) is withdrawn from the data storage file. The protective sleeve interactive spur (18), no longer supported by the upper surface of the protective sleeve (3) falls thru the latch engaging slot (6) allowing the main lever arm (18) to descend to touch the disc jacket (2), while the disc sensing lug (17) is still in contact with the upper surface of the disc jacket (2).

Attention is now drawn to FIG. 5C, showing the conditions prevailing when the protective sleeve (3) is re-inserted into the data storage file, so as to contain the disc (1) in its jacket (2). The protective sleeve interactive spur (18), having fallen through the latch engaging slot (6), is struck by the leading edge of the protective sleeve (3), and forces the secondary lever arm (16) to rotate clockwise, until arrested by the first secondary lever arm stop (23) located within the disc retaining tooth (14). The clockwise rotation having been so arrested, and the protective sleeve (3) continuing to advance within the data storage file, the main lever arm (13) is forced upwards, so disengaging the disc retaining tooth (14) from the latch engaging slot (6), the length of the secondary lever arm (16) being sufficiently long, and the degree of ingress of the protective sleeve (3) being sufficiently great, that the disc retaining tooth (14) is raised to a sufficient height above the surface of the disc jacket that, the dimple (8) on the protective sleeve, and the hole or depression (7) on the disc jacket (2) having been engaged, so as to provide a retaining force on the disc, in its jacket (2), within the protective sleeve, and the initiation of withdrawal having occurred, the locus of the disc retaining tooth (14) is such that it descends onto the upper surface of the disc jacket (2), and not back into the latch engaging slot (6), so that no retaining force is generated, allowing the disc, in its jacket (2), and protective sleeve (3), to be withdrawn, and returning conditions to those shown in FIG. 5A. Excessive clockwise rotation of the main lever arm (13) is arrested by the contact of the main lever arm stopping surface (25) with the upper surface of the protective sleeve (3).

It should be noted that the action of the second spring (15) is purely to rotate the secondary lever arm (16) counterclockwise until it is arrested by second secondary lever arm stop (23) located on the main lever arm (13), whenever a disc in its jacket (2) and/or protective sleeve is not present. To this end, the force constant of the second spring (15) must be sufficiently high that it may achieve the above arm, but also sufficiently low that, by forced rotation of the secondary lever arm (16) within the main lever arm (13), there being a disc in its jacket (2) and/or protective sleeve present, it may not cause the main lever arm (13) to life. The relative force constants of the two parts of the spring (15 & 21) are thus established.

In general, the main lever arm (13) will be in the form of a two-prong fork, containing the secondary lever (16) between the prongs, but it is not outwith the spirit of the present embodiment to implement the demonstrated geometry in a number of different ways.

DESCRIPTION OF THE SECOND PREFERRED EMBODIMENT

Figure 6:
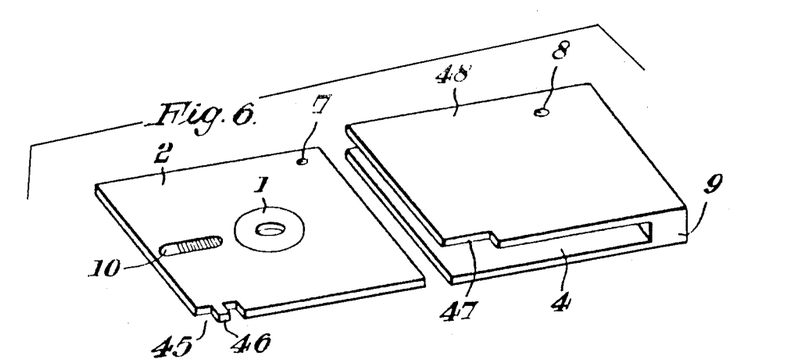
FIG. 6 shows, in exploded view, the disc, in its modified jacket, and the disc protective sleeve, of the second preferred embodiment.

Attention is drawn to FIG. 6, showing the disc, (1) in its protective jacket (2), and the new disc protective sleeve (48) in exploded view. The disc jacket (10) has the normal head access aperture (10). A slot pattern (45) is cut into the side of the disc jacket (2), wherein there remains a latch interfacing lug (46). A latch interacting recess (47) is cut into the side of the disc protective sleeve. (48) A handle (9) is provided on the disc protective sleeve (48) so that it may be removed from or inserted into a data storage file. A dimple (8) is provided in the surface of the disc protective sleeve (48), projecting into the void (4) between the two main surfaces, and a hole or depression (7) is provided in the disc jacket (2).

Figures 7, 8:
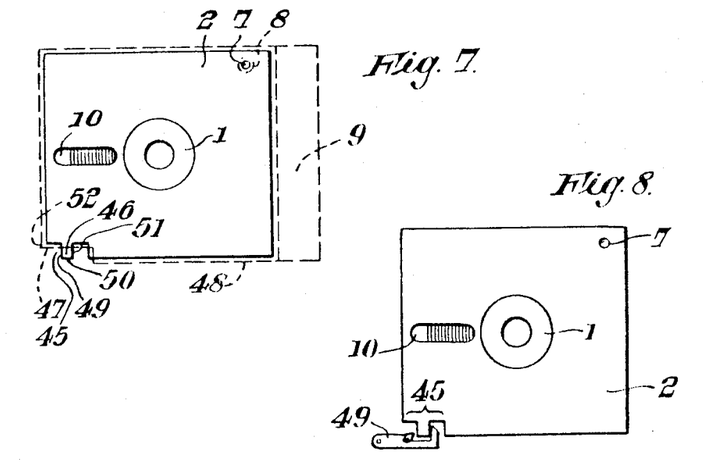
FIG. 7 shows how the various parts of the disc and protective sleeve of the second preferred embodiment come together, the disc, in its jacket, being shown in solid line and the protective sleeve in broken line.
FIG. 8 shows how the disc, in its modified jacket, and latch mechanism, of the second preferred embodiment, are related when the disc is inserted into a data storage file.

Attention is next drawn to FIG. 7 showing how the disc (1), in its jacket (2), depicted in solid line, relates to the protective sleeve (48), shown in broken line, when protected. The head access aperture (10) is fully covered by the protective sleeve (48). The dimple (8), in the surface of the protective sleeve, mates with the hole or depression (7) in the disc jacket (2), so providing a retaining force, keeping the disc (1), in its jacket (2), inside the protective sleeve (48). The latch interacting recess (47) on the protective sleeve, is shown to have a leading corner (52), while the surface of the latch interacting recess (47) cut into the side of the disc jacket (2) as shown. The latch interacting lug (46) is shown to have a leading edge (49) a flat top (50) and a trailing edge (51).

Attention is next drawn to FIG. 8, where the disc (1), in its jacket (2), is shown in relation to the latch mechanism (49) when it is loaded into a data storage file, the latch mechanism (49), being attached within the data storage file, and holding the disc (1) in its jacket (2), by means of the latch interacting lug (46).

Figure 9:
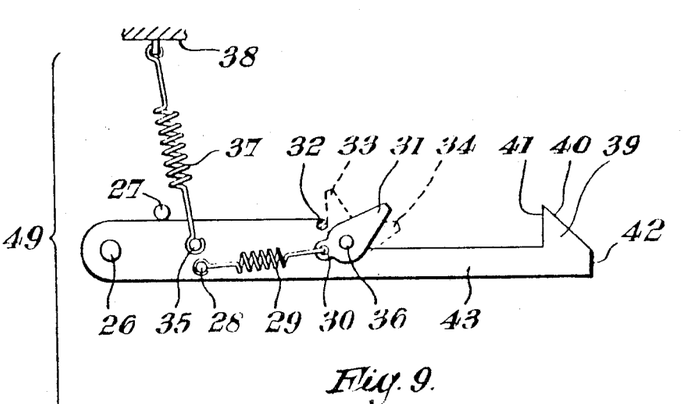
FIG. 9 shows the various parts of the latch mechanism of the second preferred embodiment.

Attention is next drawn to FIG. 9, showing the various parts of the latch assembly (49).

A main lever arm (43) is attached to the body of a data storage file by the main lever arm pivot (26). A protective sleeve interacting pawl lever (31) is attached to the main lever arm (43) by the pawl lever pivot (36). The pawl lever is free to swing, relative to the main lever arm (43), counterclockwise, to a point of arrest dictated by the pawl lever stop (32), the extreme position being indicated by a pawl lever shown in broken line (33). The pawl lever (31) is free to swing clockwise an indeterminate distance, but the extreme position, in use, is indicated by another pawl lever shown in broken line (34).

The pawl lever spring (29) is attached to the pawl lever (31) by the pawl lever spring lug (30), and to the main lever arm by the pawl lever spring main arm anchor point (28).

By tending to contract, the pawl lever spring (29) brings the pawl lever (31) to an equilibrium position midway between the two extreme positions.

A counterclockwise turning force is applied to the main lever arm (43) by means of the main lever arm spring (37), attached at one end, to the main lever arm (43) by the main lever arm spring main arm anchor point (35), and at the other end, to the body of the data storage file (38).

Counterclockwise rotation of the main lever arm (43) is arrested by the main lever arm stop (27), itself attached to the body of the data storage file (38).

The main lever arm (43) is provided at its extremity, with a disc retaining tooth (39), which possesses a bluff leading edge (42), a sloping leading edge (40), and a sheer trailing edge (41).

Attention is now drawn to FIGS. 10A thru 10E, showing the sequence of operations which occur when a disc is loaded into the data storage file.

Figure 10A:
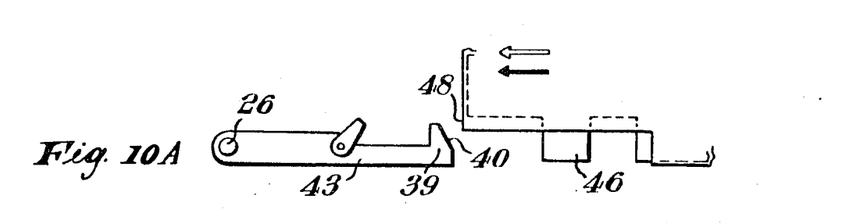
FIGS. 10A thru 10E show the sequence of events when the disc is loaded into a data storage file, using the second preferred embodiment.

FIG. 10A shows how the leading corner (52) of the protective sleeve (48) engages the sloping front (40) of the disc retaining tooth (39), forcing the main lever arm (43) to rotate clockwise against the counterclockwise restoring moment of the main lever arm spring (37).

Figure 10B:
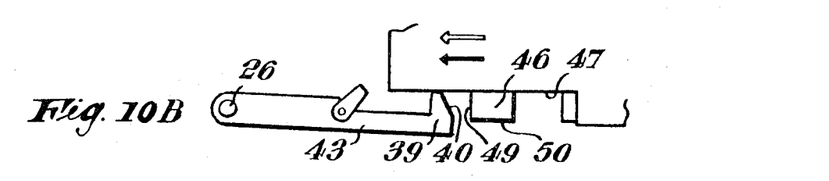

FIG. 10B shows how the disc retaining lug (39) having rotated clockwise with the main lever arm, (43), rides along the surface of the latch interacting recess (47), cut in the protective sleeve (48), so that the corner between the leading edge (49) and the flat top (50), of the latch interacting lug (46) may now engage the sloping front (40) of the disc retaining tooth (39) at the extremity of the main lever arm (43). This engagement forces the main lever arm (43) to further clockwise rotation.

Figures 10C, 10D:
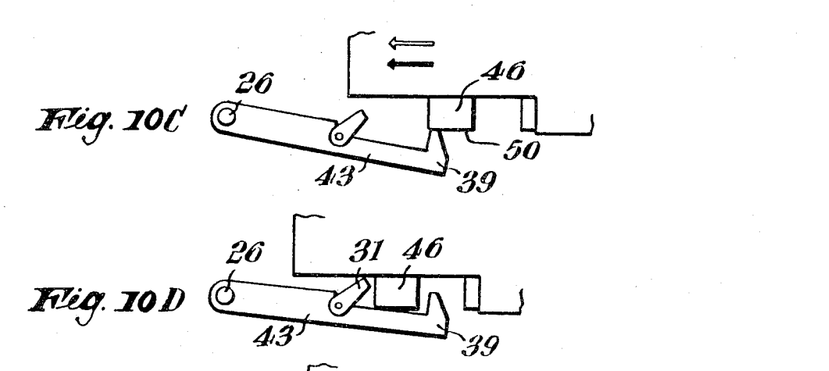

FIG. 10C shows how the further clockwise rotation of the main lever arm (43), causes the disc retaining tooth (39) to mount the latch interacting lug (46) and slide along its flat top (50).

FIG. 10D shows how the disc retaining tooth (39) next falls down behind the latch interacting lug (46). The pawl lever (31) is forced to its clockwise extreme position by the edge of the latch interacting recess (47) as the main lever arm (43) returns clockwise.

Figure 10E:
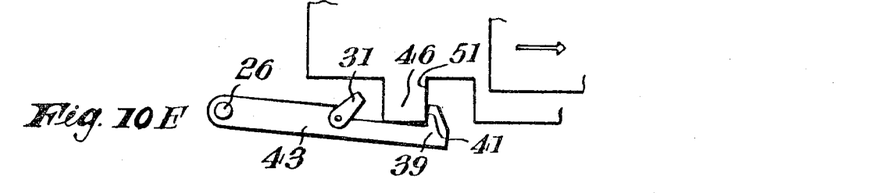

FIG. 10E shows the last stage of this sequence. The shear trailing edge (41) of the disc retaining tooth (39) mates with the trailing edge (51) of the latch interacting lug (46), providing a disc retaining force greater than that provided to retain the disc in its jacket (2) in its protective sleeve, (48). The protective sleeve (48) may thus be independently withdrawn from the data storage file, leaving the disc (1), in its jacket (2), loaded in the data storage file. On the withdrawal of the protective sleeve (48), the pawl lever (31) returns counterclockwise to its equilibrium position.

Figure 11A:
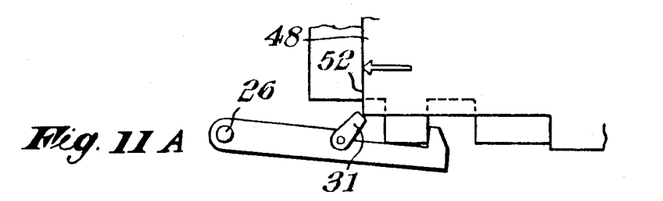
FIGS. 11A thru 11C show the sequence of events when the disc in unloaded from a data storage file using the second preferred embodiment.
Figure 11B:
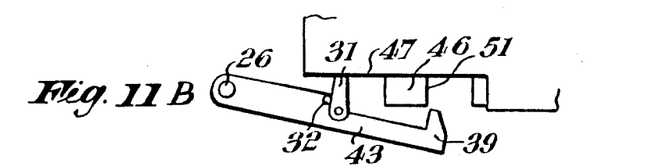
Figure 11C:
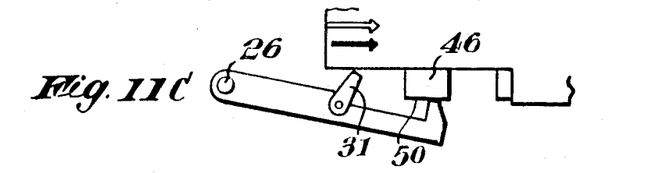

Attention is next drawn to FIGS. 11A thru 11C showing the sequence of events which occur when the protective sleeve (48), is inserted into the data storage file, so as to contain the disc (1), in its jacket (2), and withdraw it therefrom.

FIG. 11A shows how the leading corner (52) of the protective sleeve (48), engages the pawl lever (31) causing it to rotate counterclockwise.

FIG. 11B shows how the pawl lever (31) having rotated counterclockwise until arrested by the pawl lever stop (32), is forced down by the continuing advance of the protective sleeve (48), so causing the main lever arm (43) to rotate clockwise to descent, and disengage the disc retaining tooth (39), from the latch engaging lug (46), as the pawl lever (31) rides on the edge of the latch engaging recess (47).

FIG. 11C shows how the depth of descent of the main lever arm (43) is sufficient, as determined by the length of the pawl lever (31) and its position of mounting on the main lever arm, to ensure that the locus of the clockwise return of the disc retaining tooth, as the disc (1) in its jacket (2), now retained within the protective sleeve (48), is withdrawn, causes the disc retaining tooth to descend onto the flat top (50) of the latch interacting lug (46), and so provide no retaining force, allowing the disc (1) in its jacket (2), to be withdrawn without resistance.

Figure 12A:
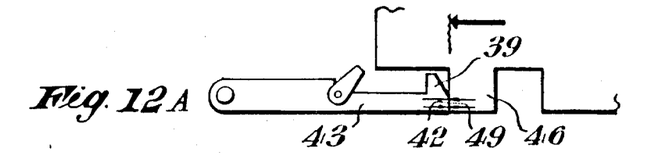
FIG. 12A shows how the second preferred embodiment prevents disc loading in the absence of the protective sleeve.
Figure 12B:
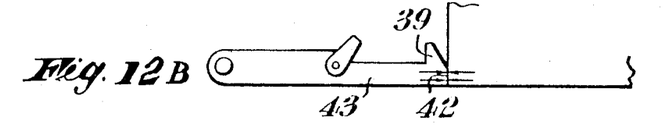
FIG. 12B shows how the second preferred embodiment prevents disc loading in any other attitude but the correct one.

Attention is finally drawn to FIG. 12, showing the impossibility of disc insertion under incorrect circumstances.

FIG. 12A shows how the disc (1) in its jacket (2), may not be inserted without the protective sleeve (48), since the bluff leading edge (42), of the disc retaining tooth (39) impacts with the leading edge (49) of the latch engaging lug (46). The two parallel edges having come together, no turning moment is exerted on the main lever arm (43) making further, full insertion of the disc impossible.

FIG. 12B shows how, if either the disc (1) in its jacket (2), or the protective sleeve (48) is presented to the latch (49) in the wrong attitude, the bluff leading edge (42) of the disc retaining tooth (39) impacts with the square edge presented to it, there being no turning moment available to the main lever arm (43), and so no possibility of further, complete insertion.

The operational criteria of this second embodiment are shown in the table given below.

| CONDITION | JACKET PRESENCE | PRESENCE OF DISC IN JACKET | DISC IN DRIVE | OPERATION |
|---|---|---|---|---|
| 1 | 1 | 1 | 0 | CAPTURE |
| 2 | 1 | 0 | 1 | RELEASE |
| 3 | 0 | 1 | 0 | BLOCK |
| 4 | 1 | 0 | 0 | NO CHANGE |
| 5 | 0 | 1 | 1 | BLOCKED BY ALREADY PRESENT DISC |
| 6 | 1 | 1 | 1 | |

-continued

| CONDITION | JACKET PRESENCE | PRESENCE OF DISC IN JACKET | DISC IN DRIVE | OPERATION |
|---|---|---|---|---|
| DISC UPSIDE DOWN, ALL CASES | | | — | BLOCKED |

1 = YES
0 = NO

According to one aspect of the present invention, there is provided a storage file for retrievable informational data which utilises removable data storage media, there being associated with that media a media protector, which contains the media and protects it whenever it is external to the storage file such that, whenever the removable media, contained within its protector, is inserted into the data storage file, the data storage file actively retains the removable media, allowing the independent withdrawal from the data storage file of the media protector, leaving the media behind, and, on re-insertion of the media protector, into the data storage file, so as to contain the removable media, already in the data storage file, the data storage file releases the removable media, allowing it, to be withdrawn by the media protector.

According to another aspect of the present invention the removable media so provided comprises a floppy (or flexible) magnetic disc or discs held in a disc jacket, which supports the flexible disc or discs and allows operational access to the disc or discs by the data storage file.

According to another aspect of the present invention, the media protector, provided for the flexible disc or discs, is an envelope of rigid material which has two large, flat surfaces which hold the disc between them and cover the active, recording surfaces of the disc or discs, but allow the disc or discs to be withdrawn from them.

According to another aspect of the present invention the removable media, as previously described is retained within the media protector, as previously described, by friction.

According to another aspect of the present invention, the removable media as described, is retained within the media protector, again as described, by means of a first retaining mechanism, a first part situated on one surface of the media protector, and projecting into the void between the two sides, which mates with second part situated on the disc jacket.

According to another aspect of the present invention there is provided a data storage file for use with flexible discs and a media protector as described, containing a latch mechanism, which retains the removable media whenever it is inserted into the data storage file, contained within the media protector and releases it whenever the media protector is reinserted, over the removable media, into the data storage file where the removable media is held within the media protector by friction.

According to another aspect of the present invention, there is provided a data storage file for use with flexible disc or discs, contained in a jacket, and a media protector as described, which contains a second retaining mechanism, such that the removable media is retained within the data storage file whenever it is inserted into the data storage file, contained within the media protector, and released whenever the media protector is reinserted, into the data storage file, over the removable media, which is retained within the media protector by the first media retaining mechanism.

According to another aspect of the present invention, the first media retaining means comprises a dimple, set into one of the two surfaces of the media protector, as described, and projecting into the void between them, which couples with a hole or depression in the disc jacket.

According to another aspect of the present invention, the second retaining mechanism, comprises a latch, located within the data storage file, which mates with a slot pattern set into the disc jacket, such that the latch mechanism is activated by the insertion of the disc and its protector into the data storage file, and de-activated by the reinsertion of the media protector, over the disc, into the disc file, the disc being retained within the protector by friction.

According to another aspect of the present invention, the second retaining mechanism comprises a latch, located within the data storage file, which mates with a slot pattern set into the disc jacket, such that the latch mechanism is activated by the insertion of the disc and its protector into the data storage file, and de-activated by the reinsertion of the media protector, over the disc, into the disc file, the disc being retained within its protector by means of the first retaining mechanism.

According to another aspect of the present invention, there is provided a latch mechanism for use in a data storage file, which utilises removable media, the removable media being provided with a media protector, where the latch comprises a holding mechanism and a releasing mechanism, the holding mechanism being rendered inoperative by the action of the releasing mechanism, such that, whenever the removable media is inserted into the data storage file, inside the media protector, the holding mechanism is activated, and retains the removable media within the data storage file, and whenever the media protector is re-inserted into the data storage file, so as to contain the removable media, which is already present and retained in the data storage file, the releasing mechanism is activated, and releases the removable media from the data storage file.

According to another aspect of the present invention, the latch mechanism so described is for use with removable media consisting of flexible or floppy magnetic discs contained in a disc jacket.

According to another aspect of the present invention, the latch mechanism, so described for use with flexible or floppy disc or discs is provided for use with a media protector comprising an envelope of rigid material having two large surfaces, the two large surfaces protecting and containing the disc or discs in its jacket.

According to another aspect of the present invention, there is provided a latch mechanism, for use in a data storage file, which utilises removable media, the removable media being provided with a media protector, where the latch comprises a holding mechanism and a releasing mechanism, the holding mechanism being rendered inoperative by the action of the releasing mechanism, such that, whenever the removable media is inserted into the data storage file, inside the media protector, the holding mechanism is activated, and retains the removable media within the data storage file, and, whenever the media protector is re-inserted into the data storage file, so as to contain the removable media, which is already present and retained within the data storage file, the releasing mechanism is activated, and releases the removable media from the data storage file, with the restrictions that, the holding mechanism will operate if and only if the removable media is inserted into the data storage within the media protector and in the correct attitude, and, the releasing mechanism will operate if and only if the media protector is inserted into the data storage file in the correct attitude, so as to contain the removable media already present and retained within the data storage file.

According to another aspect of the present invention, the latch mechanism last described is provided for use with removable media which comprises floppy or flexible disc or discs contained within a disc jacket.

According to another aspect of the present invention, the latch mechanism last described, provided for use with floppy or flexible disc or discs contained within a disc jacket, is also provided for use with a media protector, comprising an envelope of rigid material having two large surfaces, the two large surfaces protecting and containing the disc or discs in their jacket.

According to another aspect of the present invention, there is provided a camera which utilises removable film, there being associated with that film, a film protector, which contains the film and protects it whenever it is external to the camera, such that, whenever the removable film, contained within its protector, is inserted into the camera, the camera actively retains the removable film, allowing the independent withdrawal from the camera of the film protector, leaving the film behind, and, on re-insertion of the film protector, into the camera, so as to contain the removable film already in the camera, the camera releases the removable film, allowing it, to be withdrawn by the film protector.

According to another aspect of the present invention, the removable film, so provided, comprises a photosensitive sheet held in a jacket, which supports the photosensitive sheet and allows operational access to the photosensitive sheet by the camera.

According to another aspect of the present invention, the film protector, provided for the removable film, is an envelope of rigid material which holds the film and covers the photosensitive sheet, but allows the removable film to be withdrawn from it.

According to another aspect of the present invention, the removable film as previously described is retained within the film protector, as previously described, by friction.

According to another aspect of the present invention, the removable film, as described is retained within the film protector, again as described by means of a first retaining mechanism, a first part situated on the film protector, and projecting into the void of its interior, which mates with second part situated on the jacket, as described.

According to another aspect of the present invention, there is provided a camera for use with removable film, and a film protector, as described, containing a latch mechanism, which retains the removable film whenever it is inserted into the camera, contained within the media protector, and releases it whenever the film protector is reinserted, over the removable film, where the removable film is held within the film protector by friction.

According to another aspect of the present invention, there is provided a camera for use with removable film and a film protector, as described, which contains a second retaining mechanism, such that the removable film is retained within the camera whenever it is inserted into the camera, being contained within the film protector, and released whenever the film protector is re-inserted, into the camera, over the removable film, which is retained within the film protector by the first film retaining mechanism.

According to another aspect of the present invention, the first film retaining means comprises a dimple, set into the surface of the film protector, as described, and projecting into the void of its interior, which couples with a hole or depression in the jacket.

According to another aspect of the present invention, the second retaining mechanism, comprises a latch, located within the camera, which mates with a slot pattern set into the jacket, such that the latch mechanism is activated by the insertion of the film and its protector into the camera, and de-activated by the reinsertion of the film protector, over the film, into the camera, the film being retained within the protector by friction.

According to another aspect of the present invention, the second retaining mechanism comprises a latch, located within the camera, which mates with a slot pattern set into the jacket, such that the latch mechanism is activated by the insertion of the film and its protector into the camera, and deactivated by the insertion of the film protector, over the film, into the camera, the film being retained within its protector by means of the first retaining mechanism.

According to another aspect of the present invention, there is provided a latch mechanism for use in a camera, which utilises removable film, the removable film being provided with a film protector, where the latch comprises a holding mechanism and a releasing mechanism, the holding mechanism being rendered inoperative by the action of the releasing mechanism, such that, whenever the removable film is inserted into the camera, inside the film protector, the holding mechanism is activated, and retains the removable film within the camera, and whenever the film protector is re-inserted into the camera, so as to contain the removable film which is already present and retained in the camera, the releasing mechanism is activated, and releases the removable film from the camera.

According to another aspect of the present invention, the latch mechanism so described is for use with removable film consisting of photosensitive sheet contained in a jacket.

According to another aspect of the present invention, the latch mechanism, so described for use with photosensitive sheet contained in a jacket, is provided for use with a film protector comprising an envelope of rigid material, protecting and containing photosensitive sheet in its jacket.

According to another aspect of the present invention, there is provided a latch mechanism, for use in a camera, which utilises removable film, the removable film being provided with a film protector, where the latch comprises a holding mechanism and a releasing mechanism, the holding mechanism being rendered inoperative by the action of the releasing mechanism, such that, whenever the removable film is inserted into the camera, inside the film protector, the holding mechanism is activated, and retains the removable film within the camera, and, whenever the film protector is re-inserted into the camera, so as to contain the removable film which is already present and retained within the camera, the releasing mechanism is activated, and releases the removable film from the camera, with the restrictions that, the holding mechanism will operate if and only if the removable film is inserted into the camera within the film protector and in the correct attitude, and, the releasing mechanism will operate if and only if the film protector is inserted into the camera, in the correct attitude, so as to contain the removable film already present and retained within the camera.

According to another aspect of the present invention, the latch mechanism last described is provided for use with removable film which comprises a photosensitive sheet in a jacket.

According to another aspect of the present invention, the latch mechanism last described, provided for use with photosensitive sheet contained within a jacket, is also provided for use with a film protector, comprising an envelope of rigid material, protecting and containing the photosensitive sheet in its jacket.

According to another aspect of the present invention, there is provided a microfilm reader which utilises removable data storage media, there being associated with that media a media protector, which contains the media and protects it whenever it is external to the microfilm reader, such that, whenever the removable media, contained within its protector, is inserted into the microfilm reader, the microfilm reader actively retains the removable media, allowing the independent withdrawal from the microfilm reader of the media protector, leaving the media behind, and, on re-insertion of the media protector, into the microfilm reader, so as to contain the removable media, already in the microfilm reader, the microfilm reader releases the removable media, allowing it, to be withdrawn by the media protector.

According to another aspect of the present invention the removable media so provided comprises a recorded image sheet held in a jacket, which supports the recorded image sheet and allows operational access to the recorded image sheet by the microfilm reader.

According to another aspect of the present invention, the media protector, provided for the removable media, as described above, is an envelope of rigid material, which holds the removable media and covers the recorded image sheet, but allows the removable media to be withdrawn from the media protector.

According to another aspect of the present invention the removable media, as previously described is retained within the media protector, as previously described, by friction.

According to another aspect of the present invention, the removable media as described, is retained within the media protector, again as described, by means of a first retaining mechanism, a first part situated on one surface of the media protector, and projecting into the void of its interior, which mates with second part situated on the jacket.

According to another aspect of the present invention there is provided a microfilm reader for use with removable media, and a media protector as described, containing a latch mechanism, which retains the removable media whenever it is inserted into the microfilm reader, contained within the media protector, and releases it whenever the media protector is re-inserted, over the removable media, where the removable media is held within the media protector by friction.

According to another aspect of the present invention, there is provided a microfilm reader for use with removable media, consisting of a recorded image sheet, contained in a jacket, and a media protector, as described, which contains a second retaining mechanism, such that the removable media is retained within the microfilm reader whenever it is inserted into the microfilm reader contained within the media protector, and released whenever the media protector is re-inserted, into the microfilm reader, over the removable media, which is retained within the media protector by the first media retaining mechanism.

According to another aspect of the present invention, the first media retaining means comprises a dimple, set into the surface of the media protector, as described, and projecting into the void of its interior which couples with a depression or hole in the jacket.

According to another aspect of the present invention, the second retaining mechanism, comprises a latch, located within the microfilm reader, which mates with a slot pattern set into the jacket, such that the latch mechanism is activated by the insertion of the removable media and its protector into the microfilm reader, and de-activated by the re-insertion of the media protector, over the removable media, into the microfilm reader, the removable media being retained within the protector by friction.

According to another aspect of the present invention, the second retaining mechanism comprises a latch, located within the microfilm reader, which mates with a slot pattern set into the jacket, such that the latch mechanism is activated by the insertion of the removable media and its protector into the microfilm reader, and de-activated by the reinsertion of the media protector, over the removable media, into the microfilm reader, the removable media being retained within its protector by means of the first retaining mechanism.

According to another aspect of the present invention, there is provided a latch mechanism for use in a microfilm reader which utilises removable media, the removable media being provided with a media protector, where the latch comprises a holding mechanism and a releasing mechanism, the holding mechanism being rendered inoperative by the action of the releasing mechanism, such that, whenever the removable media is inserted into the microfilm reader, inside the media protector, the holding mechanism is activated and retains the removable media within the microfilm reader, and whenever the media protector is re-inserted into the microfilm reader, so as to contain the removable media, which is already present and retained in the microfilm reader, the releasing mechanism is activated, and releases the removable media from the microfilm reader.

According to another aspect of the present invention, the latch mechanism so described is for use with removable media consisting of a recorded image sheet contained in a jacket.

According to another aspect of the present invention, the latch mechanism, so described for use with a recorded image sheet held in a jacket, is provided for use with a media protector comprising an envelope of rigid material, protecting and containing recorded image sheet in its jacket.

According to another aspect of the present invention, there is provided a latch mechanism, for use in a microfilm reader, which utilises removable media, the removable media being provided with a media protector, where the latch comprises a holding mechanism and a releasing mechanism, the holding mechanism being rendered inoperative by the action of the releasing mechanism, such that, whenever the removable media is inserted into the microfilm reader, inside the media protector, the holding mechanism is activated, and retains the removable media within the microfilm reader, and, whenever the media protector is re-inserted into the microfilm reader, so as to contain the removable media, which is already present and retained within the microfilm reader, the releasing mechanism is activated, and releases the removable media from the microfilm reader with the restrictions that, the holding mechanism will operate if and only if the removable media is inserted into the microfilm reader within the media protector, and in the correct attitude, and, the releasing mechanism will operate if and only if the media protector is inserted into the microfilm reader in the correct attitude, so as to contain the removable media already present and retained within the microfilm reader.

According to another aspect of the present invention, the latch mechanism last described is provided for use with removable media which comprises a recorded image sheet contained within a jacket.

According to another aspect of the present invention the latch mechanism last described, provided for use with a recorded image sheet contained within a jacket, is also provided for use with a media protector, comprising an envelope of rigid material, protecting and containing the recorded image sheet in its jacket.

According to another aspect of the present invention, there is provided an apparatus which utilises removable media, where the removable media requires environmental protection when external to the apparatus, there being associated with that media a media protector, which contains the media and protects it whenever it is external to the apparatus, such that, whenever the removable media, contained within its protector, is inserted into the apparatus, the apparatus actively retains the removable media, allowing the independent withdrawal, from the apparatus of the media protector, leaving the media behind, and, on re-insertion of the media protector, into the apparatus, so as to contain the removable media, already in the apparatus, the apparatus releases the removable media, allowing it, to be withdrawn by the media protector.

According to another aspect of the present invention, the removable media so provided comprises a vulnerable member, held in a jacket, which supports the vulnerable member and allows operational access to the vulnerable member by the apparatus.

According to another aspect of the present invention, the media protector, provided for the vulnerable member, held in a jacket, is an envelope of rigid material, covering the vulnerable member, but allowing the removable media to be withdrawn.

According to another aspect of the present invention the removable media, as previously described, is retained within the media protector, as previously described, by friction.

According to another aspect of the present invention, the removable media, as described, is retained within the media protector, again as described, by means of a first retaining mechanism, a first part situated on the media protector, which mates with second part, situated on the disc jacket.

According to another aspect of the present invention, there is provided an apparatus for use with removable media, and a media protector, as described, containing a latch mechanism, which retains the removable media whenever it is inserted into the apparatus, contained within the media protector, and releases it whenever the media protector is reinserted, over the removable media, where the removable media is held within the media protector by friction.

According to another aspect of the present invention, there is provided an apparatus for use with a vulnerable member, contained in a jacket, and a media protector, as described, which contains a second retaining mechanism, such that the removable media is retained within the apparatus whenever it is inserted into the apparatus, being contained within the media protector, and released whenever the media protector is re-inserted, into the apparatus, over the removable media, which is retained within the media protector by the first media retaining mechanism.

According to another aspect of the present invention, the first media retaining means comprises a dimple, set into the surface of the media protector, as described, and projecting into the void of its interior which couples with a depression or hole in the jacket.

According to another aspect of the present invention, the second retaining mechanism, comprises a latch, located within the apparatus, which mates with a slot pattern set into the jacket, such that the latch mechanism is activated by the insertion of the removable media and its protector, into the apparatus, and de-activated by the reinsertion of the media protector, over the removable media, into the apparatus, the removable media being retained within the protector by friction.

According to another aspect of the present invention, the second retaining mechanism comprises a latch, located within the apparatus, which mates with a slot pattern set into the jacket, such that the latch mechanism is activated by the insertion of the disc and its protector into the apparatus, and de-activated by the reinsertion of the media protector, over the removable media, into the apparatus, the removable media being retained within its protector by means of the first retaining mechanism.

According to another aspect of the present invention, there is provided a latch mechanism for use in an apparatus, which utilises removable media, where the removable media requires environmental protection when external to the apparatus, the removable media being provided with a media protector, where the latch comprises a holding mechanism and a releasing mechanism, the holding mechanism being rendered inoperative by the action of the releasing mechanism, such that, whenever the removable media is inserted into the apparatus, inside the media protector, the holding mechanism is activated, and retains the removable media, within the apparatus, and, whenever the media protector is re-inserted into the apparatus, so as to contain the removable media, which is already present and retained in the apparatus, the releasing mechanism is activated, and releases the removable media from the apparatus.

According to another aspect of the present invention, the latch mechanism, so described, is for use with removable media consisting of a vulnerable member contained in a jacket.

According to another aspect of the present invention, the latch mechanism, so described, for use with a vulnerable member contained in a jacket, is provided for use with a media protector comprising an envelope of rigid material, protecting and containing the vulnerable member in its jacket.

According to another aspect of the present invention, there is provided a latch mechanism, for use in an apparatus, which utilises removable media, where the removable media requires environmental protection when external to the apparatus, the removable media being provided with a media protector, where the latch comprises a holding mechanism and a releasing mechanism, the holding mechanism being rendered inoperative by the action of the releasing mechanism, such that, whenever the removable media is inserted into the apparatus, inside the media protector, the holding mechanism is activated, and retains the removable media within the apparatus, and, whenever the media protector is re-inserted into the apparatus, so as to contain the removable media, which is already present and retained within the apparatus, the releasing mechanism is activated, and releases the removable media from the apparatus, with the restrictions that, the holding mechanism operates, if and only if the removable media is inserted into the apparatus within the media protector, and in the correct attitude, and, the releasing mechanism operates, if and only if the media protector is inserted into the apparatus, in the correct attitude, so as to contain the removable media already present and retained within the apparatus.

According to another aspect of the present invention, the latch mechanism last described is provided for use with removable media which comprises a vulnerable member contained within a jacket.

According to a last aspect of the present invention the latch mechanism last described, provided for use with a vulnerable member contained within a jacket, is also provided for use with a media protector, comprising an envelope of rigid material, protecting and containing the vulnerable member in its jacket.

What I claim is:

1. A camera system comprising:
removable film having a photosensitive sheet and encasing means for said photosensitive sheet, said encasing means surrounding said supporting said photosensitive sheet, said encasing means providing operational access of said camera to said photosensitive sheet;
film protecting means for containing and protecting said film wherein said film protecting means comprises an envelope of rigid material where said envelope fits over said removable film, said envelope protecting and containing said removable film and where said envelope is provided with an opening whereby said removable film may enter or be withdrawn, said removable film being retained in said film protecting means by friction, said film protecting means containing and protecting said film where on insertion of said film contained in said film protecting means into said camera said film is actively retained by said camera allowing independent withdrawal from said camera of said film protecting means and where on reinsertion of said film protecting means into said camera so as to contain said removable film and removable film is released by said camera being retained within said film protecting means on withdrawal of said film protecting means from said camera; and
second film retaining means comprising a first part situated on said encasing means and second part situated within said camera, such that said first and second parts of said second film retaining means come together when said removable film is fully inserted into said camera, said second film retaining means on insertion of said film, enclosed within said film protecting means, into said camera providing a retaining force on said removable film such that said film protecting means may be withdrawn independently against said friction force, leaving said removable film within said camera and where on reinsertion of said film protecting means over said removable film into said camera, said second film retaining means provides no retaining force, allowing said removable film contained within said film protecting means by said frictional force to be withdrawn from said camera together with said film protecting means.

2. A camera as recited in claim 1 wherein,
said first part of said second film retaining means is a slot pattern cut into said encasing means and
said second part of said second film retaining means is a latch mechanism,
said latch mechanism being activated by the insertion of said removable film together with said media protecting means,
said latch engaging with the said slot pattern and
with the removable data film alone present, in said camera, said latch mechanism is de-activated by the insertion of said film protecting means, into said camera, so as to contain said removable film, said latch disengaging said slot pattern.

3. A camera which employs:
removable film having a photosensitive sheet and encasing means for said photosensitive sheet, said encasing means surrounding and supporting said photosensitive sheet, said encasing means providing operational access of said camera to said photosensitive sheet;
film protecting means for containing and protecting said film wherein said film protecting means is an envelope of rigid material where said envelope fits over said removable film, said envelope protecting and containing said removable film, and where said envelope is provided with an opening whereby said removable film may enter or be withdrawn, said removable film being retained in said film protecting means by a first film retaining means comprising a first part situated on said film protecting means and a second part situated on said film encasing means such that the first and second parts of said first film retaining means come together when said removable film is fully inserted into said film protecting means and on coming together said first and second parts of said first film retaining means provides a force which retains such removable film within said film protecting means; and
second film retaining means comprising a first part situated within said camera and a second part such that said first and second parts of said second film retaining means come together when said removable film is fully inserted into said camera, said second film retaining means, on insertion of said removable film enclosed within said film protecting means, into said camera, providing a retaining force on said removable film such that said film protecting means may be withdrawn independently from said camera against said force provided by said first film retaining means leaving said removable film within said camera and where on reinsertion of said film protecting means over said removable film into said camera, said second film retaining means provides no retaining force, allowing said removable film contained within said film protecting means by said force provided by said first film retaining means to be withdrawn from said camera together with said film protecting means.

4. A camera as recited in claim 3 wherein,
said first part of said second film retaining means is a slot pattern cut into said encasing means and
said second part of said second film retaining means is a latch mechanism, such that,
said latch mechanism is activated by the insertion of said removable film together with said film protecting means so that said latch engages said slot pattern, and
with the said removable film alone present, in said camera, said latch mechanism is deactivated by the insertion of said film protecting means into said camera, so as to contain said removable film
said latch disengaging said slot pattern.

5. An apparatus for the storage of retrievable informational data in a data storage file comprising:
removable data storage media comprising at least one flexible magnetic disc and encasing means for said at least one flexible magnetic disc for surrounding and supporting said at least one flexible magnetic disc and for providing operational access by said data storage file to said at least one flexible magnetic disc;
media protecting means for containing said protecting said removable data storage media, said media protecting means comprising an envelope of rigid material capable of fitting snugly over said removable data storage media and having two large surfaces for protecting and containing said removable data storage media and having an opening whereby said removable data storage media may be entered or be withdrawn;
removable data storage media retaining means which is activated by insertion of said removable data storage media contained in said media protecting means into said data storage file so as to retain said removable data storage media in said data storage file and allow independent withdrawal from said data storage file of said media protecting means and which is released by reinsertion of said media protecting means into said data storage file in a predetermined attitude so as to allow withdrawal of said removable data storage media contained in said media protecting means from said data storage files; and
first media retaining means which comprises a first part situated on said media protecting means and a second part situated on said encasing means such that when said removable data storage media is fully inserted into said media protecting means said first and second parts of said first media retaining means come together and provide a force which tends to retain said removable data storage media within said media protecting means.

6. An apparatus as recited in claim 5, wherein said removable data storage media retaining means comprises a first part situated on said encasing means and a second part situated within said data storage file such that full insertion of said removable data storage media contained within said media protecting means into said data storage file causes said first and second parts of said removable data storage media retaining means to come together so as to provide a retaining force on said removable data storage media such that said media protecting means may be withdrawn independently against said force which tends to retain said removable data storeage media within said media protecting means leaving said removable data storage media in said data storage file and such that reinsertion of said media protecting means over said removable data storage media in said data storage file causes said first and second parts of said removable data storage media retaining means to release so as to remove said retaining force on said removable data storage media such that said removable data storage media contained in said media protecting means by said force which tends to retain said removable data storage media within said media protecting means may be withdrawn from said data storage file.

7. An apparatus as recited in claim 6 wherein said first part of said removable data storage media retaining means is a slot pattern cut into said encasing means and said second part of said removable data storage media retaining means is a latch mechanism, said latch mechanism being activated by the insertion of said removable data storage media together with said media protecting means into said data storage file so as to engage with said slot pattern, said latch mechanism being deactivatable when said removable data storage media is alone present in said data storage file by the insertion of said media protecting means into said data storage file so as to contain said removable data storage media and so as to disengage said latch from said slot pattern.

8. An apparatus for the storage of retrievable informational data in a data storage file comprising:
removable data storage media comprising at least one flexible magnetic disc and encasing means for said at least one flexible magnetic disc for surrounding and supporting said at least one flexible magnetic disc and for providing operational access by said data storage file to said at least one flexible magnetic disc;
media protecting means for containing and protecting said removable data storage media, said media protecting means comprising an envelope of rigid material capable of fitting snugly over said removable data storage media and having two large surfaces for protecting and containing said removable data storage media and having an opening whereby said removable data storage media may enter or be withdrawn, said removable data storage media being retained in said media protecting means by friction;
removable data storage media retaining means which is activated by insertion of said removable data storage media contained in said media protecting means into said data storage file so as to retain said removable data storage media in said data storage file and allow independent withdrawal from said data storage file of said media protecting means and which is released by reinsertion of said media protecting means into said data storage file in a predetermined attitude so as to allow withdrawl of said removable data storage media contained in said media protecting means from said data storage file, said removable data storage media retaining means comprising a first part situated on said encasing means and a second part situated within said data storage file such that full insertion of said removable data storage media contained within said media protecting means into said data storage file causes said first and second parts of said removable data storage media retaining means to come together so as to maintain a retaining force on said removable data storage media such that such media protecting means may be withdrawn independently against said friction force leaving said removable data storage media in said data storage file and such that reinsertion of said media protecting means over said removable data storage media in said data storage file causes said first and second parts of said removable data storage retaining means to release so as to remove said retaining force on said removable data storage media such that said removable data storage media contained in said media protecting means by said friction force may be withdrawn together from said data storage file.

9. An apparatus as recited in claim 8 wherein said first part of said removable data storage media retaining means is a slot pattern cut into said encasing means and said second part of said removable data storage media retaining means is a latch mechanism, said latch mechanism being activated by the insertion of said removable data storage media together with said media protecting means into said data storage file so as to engage with said slot pattern, said latch mechanism being deactivatable when said removable data storage media is alone present in said data storage file by the insertion of said media protecting means into said data storage file so as to contain said removable data storage media and so as to disengage said latch from said slot pattern.

10. A latch mechanism for use in a data storage file for removable data storage media having a protective cover which is to contain the removable data storage media only when the removable data storage media is outside the data storage file and not when the removable data storage media is being read from or written on inside the data storage file comprising:
a primary lever arm pivotally attached to the frame of said data storage file, said primary lever arm having latch means for retaining said removable data storage media in said data storage file when said removable data storage media contained in its protective cover is inserted into said data storage file and said protective cover is withdrawn; and
a secondary lever arm pivotally attached to said primary lever arm, said secondary lever arm having releasing means responsive to the insertion of said protective cover into said data storage file over said removable data storage media for releasing said latch means such that said removable data storage media within said protective cover may be withdrawn.

11. The latch mechanism according to claim 10 further comprising first resilient means providing a force tending to rotate said primary lever arm counterclockwise with respect to said data storage file and a second resilient means providing a force tending to rotate said secondary lever arm counterclockwise with respect to the said primary lever arm.

12. The latch mechanism according to claim 10 wherein said latch means comprises a retaining tooth formed on one end of said primary lever arm for perpendicular engagement with a slot in said removable data storage media for retaining said removable data storage media in said data storage file while said protective cover is being withdrawn.

13. A latch mechanism according to claim 12 wherein said primary lever arm further comprises a first ledge for limiting clockwise rotation of said secondary lever arm with respect to said primary lever arm and a second ledge for limiting counterclockwise rotation of said secondary lever arm with respect to said primary lever arm.

14. A latch mechanism according to claim 13 wherein said primary lever arm further comprises a sloping surface on one end for contacting said protective cover in order to limit the clockwise rotation of said primary lever arm with respect to said data storage file when said protective cover is reinserted into said dat storage file over said removable data storage media.

15. A latch mechanism according to claim 12 wherein said releasing means comprises a spur which is positioned to block the path of said protective cover as it is reinserted over said removable data storage media whereby the inward motion of said protective cover causes said secondary lever arm to rotate with respect to said primary lever arm which in turn causes said primary lever arm to rotate with respect to said data storage file and to move on the end on which said retaining tooth is formed, causing said retaining tooth to move perpendicularly out of slot in said removable data storage media, freeing said removable data storage media for withdrawl along with its protective cover out of said data storage file.

16. A latch mechanism according to claim 15 wherein said secondary lever arm further comprises a removable data storage media sensing lug on one end for contacting said removable data storage media when it is inserted into said data storage file and causing said secondary lever arm to rotate with respect to said primary lever arm such that said spur falls through the slot in said removable data storage media and is in position to block the path of said protective cover as it is reinserted over said removable data storage media.

* * * * *